2,930,751

REMOVING ODORS FROM HYDROCARBON FUELS WITH TRISODIUM PHOSPHITE AND BENTONITE

Frank J. Holland, Spokane, Wash.

No Drawing. Application January 23, 1956
Serial No. 560,869

4 Claims. (Cl. 208—287)

The present invention relates to filtering fluid hydrocarbon fuels and particularly to filtering the fuels gasoline, kerosene and crude petroleum. It is the purpose of my invention to provide a filtering mechanism for such products which is effective to reduce the odorous after products of burning the fuels in vehicle internal combustion engines and improve the complete combustion of the fuels, and which includes only materials which are ineffective to damage the physical parts of the engine.

My invention consists in providing as a filter a colloidal clay (bentonite) in combination with a trisodium phosphate and a sufficient amount of kerosene (stove oil) to cause the loose adherence of the colloidal clay to the crystals of the trisodium phosphate. The trisodium phosphate is substantially insoluble in the fuels but is soluble in water. The colloidal clay has a high affinity for water and will absorb large quantities of water and swells considerably upon wetting.

I have found that by using this filtering medium and flowing the fuels through it before burning, it is possible to overcome objectionable carrying over of unburned carbon and obnoxious odor producing substances in the products of combustion. For example, an automobile engine, when started and idling, produces a quantity of unburned carbon material evidenced at the exhaust pipe by a considerable deposit of carbon. When the fuel (gasoline) is filtered through this medium as it is fed to the carburetor the carbon deposits are substantially avoided. Likewise the percentage of $CO_2$ and CO in the exhaust gas is changed, more $CO_2$ and less CO being found.

Another remarkable and unexpected result is the marked reduction in obnoxious odors in the exhaust. It is thought that the most common cause of the obnoxious odor is the presence of some pyridine in the fuel oil. I attribute the reduction in obnoxious odor to the retention in the filter medium of most of the pyridine present in the fuel. This is established by the fact that after filtering many gallons of gasoline through the filter medium a liquid is found in the filter medium which contains a high percentage of pyridine. The pyridine is difficult to remove entirely from gasoline because it boils at temperatures near the gasoline range. There is also present in petroleum fuels and even in gasoline a certain amount of water, about .006% in standard grades of gasoline. It is believed that the pyridine is more readily attracted to the water in the gasoline when the water is brought into contact with the trisodium phosphate. The resulting alkaline solution appears to cause the colloidal clay to adsorb the pyridine and other products in the fuel oil that produce the obnoxious odors in the combustion products of the fuel oils.

The exact nature of the action of the filtering medium is reducing the proportions of unburned carbon and carbon monoxide in the products of combustion is not understood. However, it appears to provide a catalyst that increases the efficiency of combustion of oxygen in the air with the carbon in the fuel. The amount of filtering medium carried over with the fuel is much too slight to provide the extra oxygen from the filtering medium itself.

Gasoline filtered through a bed of the filter medium showed an increase in phosphate content from 2.2 parts per million found in the gasoline before filtering to 3.7 parts per million.

Spectographic analysis of the solid residues obtained from evaporating gasoline before and after filtering through the filter medium showed a very slight increase of aluminum, barium, iron, magnesium, phosphorus silicon and sodium content in the residue of the filtered gasoline over the content in the residue of the unfiltered gasoline which could be due to pick up of these minerals from the colloidal clay. The total dissolved solids content in the gasoline was about one-third greater in the filtered gasoline than in the unfiltered gasoline.

A remarkable result of the filtering of the gasoline, however, was the absorption in the filtering medium of approximately .03 fluid ounce per gallon of gasoline filtered of a dark brown odoriferous liquid having the characteristic pyridine odor plus other odors that have not been identified.

Tests were made to compare visually the products of combustion resulting from operation of a diesel type internal combustion engine with filtered crude oil and unfiltered crude oil. Under like conditions of atmospheric temperature the engine was supplied with the two fuels. When the engine was subjected to load and burned unfiltered crude oil the exhaust had the usual obnoxious odor and carried a substantial amount of black smoke increasing with increased load of the engine. When the engine was supplied with crude oil filtered through a bed of the filtering medium and subjected to the same loading there was almost none of the obnoxious odor and no black smoke at the exhaust for the same loads that had created excessive smoke discharge from the engine when burning unfiltered fuel.

Another visual test was made utilizing a standard Chevrolet automobile. The car was first supplied with unfiltered gasoline of a well known make purchased at a filling station. The car was placed where the exhaust would discharge over a clean white surface. The engine was started and allowed to idle for several minutes. The white surface beneath the exhaust discharged was visibly blackened by carbon particles deposited from the exhaust. The engine and car were then allowed to cool and a container of the filter medium was inserted between the fuel pump and the carburetor. The engine was again started and idled for several minutes, the exhaust being discharged over a clean white surface. No blackening of the surface was observed after idling the engine for the same time as in the first trial with unfiltered gasoline.

A series of measurements of carbon dioxide and carbon monoxide content of the combustion gases resulting from burning filtered gasoline and unfiltered gasoline under like conditions were made. The results of these tests were as follows:

|  | Percent |
|---|---|
| Av. $CO_2$ content of gases of combustion from unfiltered gasoline | 9.6 |
| Av. CO content of gases of combustion from unfiltered gasoline | 0.4 |
| Av. $CO_2$ content of gases of combustion from unfiltered gasoline | 13.1 |

Av. CO content of gases of combustion from filtered gasoline too small to measure.

The proportions of bentonite to trisodium phosphate crystals is not very critical but the bentonite should be greater in amount by weight than the trisodium phosphate. I find that about two parts bentonite to one part trisodium phosphate by weight is best. The kerosene is used sparingly, just enough to agglomerate the bentonite with the trisodium phosphate. It must be a substantially sulphur free kerosene. The trisodium phosphate is crystalline and the granules serve to support the bentonite so that it is well distributed through the body of filter medium and does not separate out. The kerosene makes the bentonite adhere loosely so it won't separate from the crystals. Any suitable container may be used for the filter medium.

It is believed that the foregoing description will enable those skilled in the art to practice the invention.

Having thus described my invention, I claim:

1. A method of treating fluid petroleum fuels such as crude oil, gasoline, and kerosene to reduce obnoxious odors in the gases of combustion of such fuels, which comprises passing the fuels before combustion through a filter medium consisting essentially of a mixture of bentonite and trisodium phosphate agglomerated by kerosene.

2. A method of treating fluid petroleum fuels such as crude oil, gasoline, and kerosene to improve the combustion qualities thereof which comprises filtering the fuel through a filter medium consisting essentially of bentonite particles and trisodium phosphate particles agglomerated by kerosene.

3. A filter medium for fluid petroleum fuels consisting essentially of trisodium phosphate crystals and bentonite with kerosene, the proportion of bentonite being greater than the proportion of trisodium phosphate by weight.

4. A method of reducing obnoxious odors in the gases of combustion of fluid petroleum fuels such as crude oil, gasoline, and kerosene, which comprises passing such fuels, immediately before burning, through a filter medium consisting essentially of an agglomeration of granular trisodium phosphate and bentonite.

References Cited in the file of this patent

UNITED STATES PATENTS

| | | |
|---|---|---|
| 1,661,731 | Meston | Mar. 6, 1928 |
| 1,926,813 | Morgan | Sept. 12, 1933 |
| 1,943,519 | Denning | Jan. 16, 1934 |
| 1,943,584 | Cross | Jan. 16, 1934 |
| 2,112,799 | Williams | Mar. 29, 1938 |
| 2,233,093 | Carman et al. | Feb. 25, 1941 |
| 2,508,602 | Goetz | May 23, 1950 |
| 2,701,240 | Bregar | Feb. 1, 1955 |
| 2,751,336 | Davis | June 19, 1956 |